June 16, 1959 A. MACOVSKI 2,891,104

COLOR BURST SEPARATION SYSTEM

Filed Sept. 14, 1954 2 Sheets-Sheet 1

INVENTOR.
ALBERT MACOVSKI
BY
[signature]
ATTORNEY

COLOR BURST SEPARATION SYSTEM

Filed Sept. 14, 1954 2 Sheets-Sheet 2

INVENTOR.
ALBERT MACOVSKI
BY
[signature]
ATTORNEY

United States Patent Office 2,891,104

Patented June 16, 1959

2,891,104

COLOR BURST SEPARATION SYSTEM

Albert Macovski, Massapequa, N.Y., assignor to Radio Corporation of America, a corporation of Delaware Application September 14, 1954, Serial No. 455,937

2 Claims. (Cl. 178—5.4)

The present invention relates to circuits for multiplexing a pair of component signals in the output circuit of an amplifier circuit and more particularly, the invention relates to means for separating the color synchronizing burst from the chrominance signal in a chrominance signal amplifier in a color television receiver.

In the color television signal which conforms to standards approved by the Federal Communications Commission on December 17, 1953, four types of information are transmitted from the signal source.

One type of information is the deflection scanning synchronization information.

A second type of information represents the brightness or luminance signal which conveys the black and white or monochrome image information; the luminance signal.

A third type of information which is transmitted from the signal source is a chrominance signal containing color-difference signal information which is transmitted on a color modulated subcarrier wave having a mean frequency of 3.58 mcs. This color-difference signal information describes how each color in the televised scene differs from the color content of the corresponding color in the luminance signal. The color-difference signal information present in the chrominance signal may be demodulated by synchronous detection or demodulation using a locally generated reference signal at a phase which is representative of the particular color-difference signal being demodulated and which is related to what is hereinafter referred to as a reference phase.

In order to provide reference phase signal information, a fourth type of information is transmitted. This fourth type of picture information is in the form of color synchronizing bursts of approximately eight cycles of a wave having a frequency of 3.58 mcs. These color synchronizing bursts are transmitted on the back porch of the horizontal synchronizing pulses.

In a color television receiver, means must be provided for separating the color synchronizing burst from the color television signal so that the color synchronizing bursts may be utilized for the synchronizing of a reference signal source which is used to provide signals for synchronous detection.

It is, therefore, an object of this invention to provide an improved color synchronizing burst separation circuit.

It is a further object of this invention to provide a color synchronizing burst separation circuit wherein the reference phase indicated by the color synchronizing burst after amplification, has not been shifted in phase as referred to the phases of the color-difference signals contained in the chrominance signal.

It is another object of this invention to provide a means for separating the color synchronizing burst from the chrominance signal in the output circuit of the chrominance amplifier.

It is a still further object of this invention to provide a final chrominance amplifier having a chrominance signal output circuit and also a color synchronizing burst output circuit which provides the function of separating the color synchronizing burst from the chrominance signal.

It is another object of this invention to provide a color synchronizing burst separation circuit wherein the chrominance signal and the color synchronizing burst are amplified in the same amplifying channels.

According to one form of the invention, a chrominance amplifier stage is utilized which has a pair of output circuits in series. One of these output circuits has a frequency response and a bandwidth which is suitable for the development of the chrominance signal across this output circuit. The second output circuit is a sharply tuned resonant circuit responsive to the frequency of the color synchronizing burst. Across the second output circuit is a shunt connected limiter which is normally conducting during each scanning line thereby causing substantially all the output voltage of the chrominance amplifier to appear across the first output circuit. During the time interval of the color synchronizing bursts a horizontal gating pulse applied to the limiter renders the limiter non-conducting, and the color synchronizing burst is then developed across the second output circuit which is designed to have a somewhat higher impedance than that of the first output circuit. The second output circuit is then coupled to the reference phase signal generating circuits to provide phase synchronization of the reference signal which is generated by this circuit.

Other and incidental objects of this invention will become apparent upon a reading of the following specification and a study of the drawing wherein.

Figure 1:
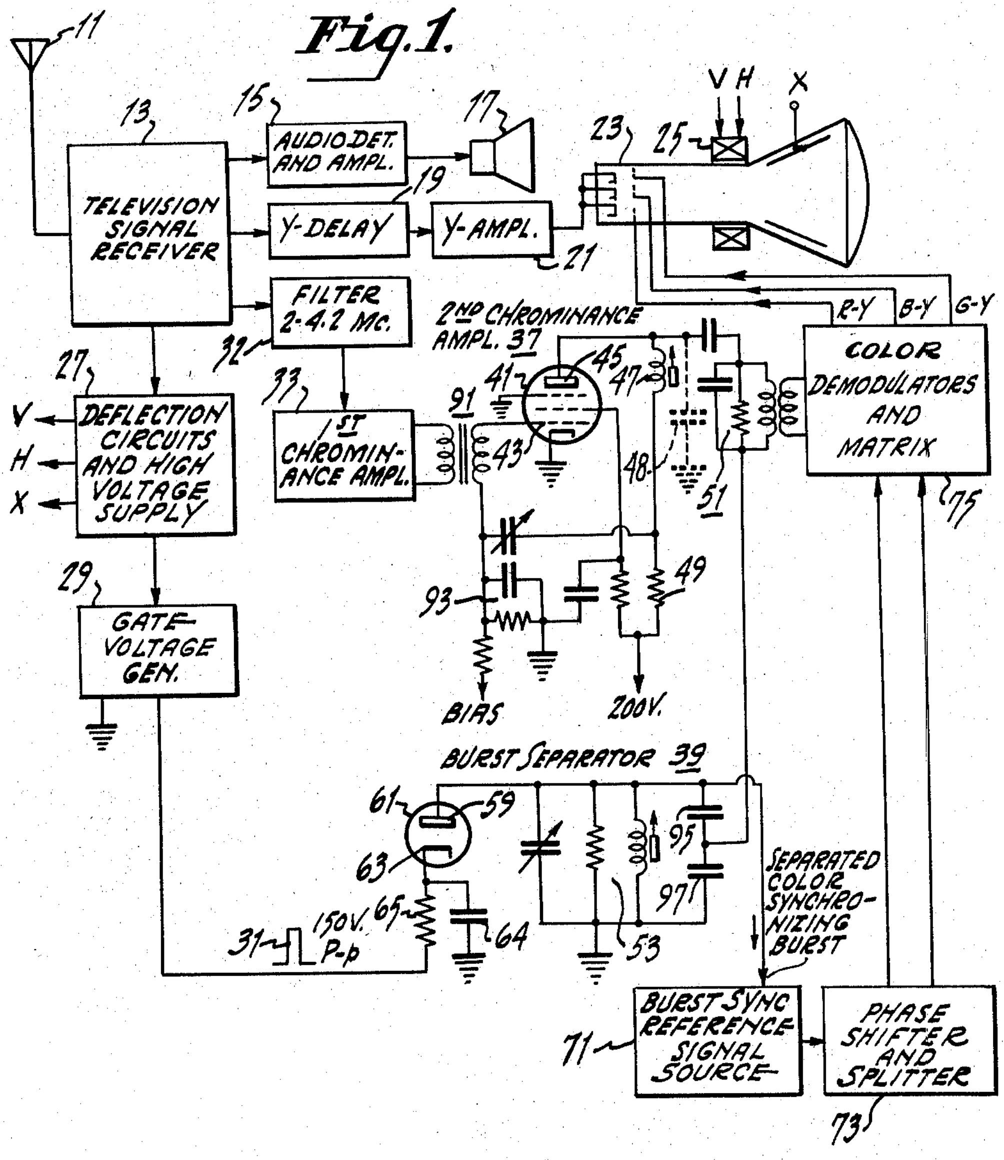
Figure 1 is a diagram of a color television receiver diagram which includes a schematic circuit of the chrominance amplifier and burst separation circuit which forms one embodiment of the present invention.

In the color television circuit shown in Figure 1, the incoming color television signal, as transmitted on a carrier of prescribed frequency, reaches the antenna 11 and is applied to the color television signal receiver 13. In the television signal receiver 13 such functions as first detection, intermediate frequency amplification and second detection are accomplished. These and other functions provided in television signal receivers are described, for example, in the article entitled "Television Receivers" by Antony Wright in the March 1947 issue of the RCA Review. The television signal receiver 13 demodulates the color television signal; this signal including vertical and horizontal deflection-synchronization information, a luminance signal which will hereinafter be referred to as a Y signal, a chrominance signal and, in one form of color television receiver, the audio signal which is transmitted on a frequency modulated sound carrier 4.5 mcs. removed from the video carrier.

Using, for example, an intercarrier sound circuit, the audio signal may be detected and amplified in the audio detector and amplifier 15 and applied to the loud speaker 17.

The luminance or Y signal is applied to the Y delay line 19 and amplified in the Y amplifier 21, from which circuit it is applied to the cathodes of the color image reproducer 23.

The vertical and horizontal deflection signals are separated from the color television signal in the deflection circuits and high voltage supply 27 which produces vertical and horizontal deflection signals and applies them to the yokes 25; the deflection circuits and high voltage supply 27 also supplies both a high voltage for the application to the ultor of the color image reproducer 23, and activation of the gate voltage generator 29 which provides a gate pulse 31. The gate pulse 31 has a duration interval which is at least that of the color synchronizing burst. The gate voltage generator 29 is typically in the form of a fly-back winding which is incorporated on the high voltage supply transformer. In some color television receiver circuits, however, the gate voltage generator 31 is in the form of a multivibrator which is activated by selected synchronizing pulses in the color television signal.

The chrominance signal which is a color-modulated subcarrier is derived from having the color television signal applied to the filter 32, which has a pass band from approximately 2 to 4.2 mcs. If full color utilization is not being made of the chrominance signal, this pass band may be reduced to a range of from approximately 3 to 4.2 mcs.

The filtered color television signal, which represents the chrominance signal, is then applied from the filter 32 to the first chrominance amplifier 33, which amplifies the chrominance signal up to a first desired amplitude level. The output of the first chrominance amplifier 33 is applied to the second chrominance amplifier 37. The output of the second chrominance amplifier 37 applies the amplified chrominance signal to the color demodulators and matrix 75 and a separated color synchronizing burst to the burst-synchronized reference signal source 71. The burst-synchronized reference signal source 71 applies a phase synchronized 3.58 mcs. reference phase signal to the phase shifter and splitter 73, which applies synchronous demodulating signals of proper phase to the color demodulators and matrix 75.

Using one of several means of synchronous demodulation and matrixing as described, for example, by D. H. Pritchard and R. N. Rhodes in their paper entitled "Color Television Signal Demodulators" as published in the June 1953 issue of the RCA Review, color-difference signals of the type $R-Y$, $B-Y$ and $G-Y$, are developed by the color demodulators and matrix 75 and applied to proper control electrodes of the color image reproducer 23. In the color image reproducer 23, addition of the luminance or Y signal and the respective color-difference signals; namely, the $R-Y$, $B-Y$ and $G-Y$ signals, is accomplished, with the televised color television image then being reproduced on the image face of the color image reproducer 23.

Consider now the operation of the second chrominance amplifier 27 which contains one embodiment of the present invention. As has been previously described, the first chrominance amplifier 33 applies a chrominance signal at a proper amplitude level to the second chrominance amplifier 37. This chrominance signal contains not only the color modulated subcarrier, but also the color synchronizing burst which passes through the filter 32.

The output circuit of the second chrominance amplifier 37 contains three component output circuits. One component output circuit includes the tuned inductance 47 whose function will be described later in this specification. A second component output circuit of the second chrominance amplifier 37 is the resonant circuit hereinafter referred to as the chroma tank 51 which is adjusted to have bandwidth and frequency response characteristics suitable for developing an amplified chrominance signal so that this amplified chrominance signal can be applied to the sync demodulators and matrix 75. The third component output circuit is the tuned circuit hereinafter referred to as the burst tank 53. The burst tank 53 is included in the burst separator 39. The burst tank 53 is a high impedance sharply-resonant tuned-circuit which is tuned to the frequency of the color synchronized burst.

The series connection from the chroma tank 51 to the bust tank 53 is made to the common connection of the serially connected condensers 95 and 97 which form a shunt element of the burst tank 53. The burst separator 39 also includes a limiter or loading device which is shown in the form of a diode 61 is connected so that it is substantially in shunt with the burst tank 53.

The output circuit of the second chrominance amplifier 37 operates as follows: By coupling the diode 61 in series with the decay network made up of the resistor 65 and the condenser 64, peak-detection action will take place and the diode 61 will pass a charging current at least during the line scanning interval and will, for all practical purposes, present a substantial load to the burst tank 53 during this interval. During each scanning line interval, the diode 61 thereupon virtually short circuits the burst tank 53 so that the chrominance signal is principally developed across the chroma tank 51. The charging current must be adjusted so that it is at all times greater than the peak alternating current chrominance signal current which flows through the diode 61; this chrominance signal component must not be permitted to cut off the diode. This happens automatically if the tube is operated class A.

During the horizontal retrace time, the gate pulse 31, which has a duration interval at least that of the color synchronizing burst is developed. By application of this gate pulse 31, which is of positive polarity and about 150 volts peak-to-peak voltage, to the cathode 63 of the diode 61, the cathode potential is raised to a much higher potential than that of the anode of the diode 61, thereby cutting off the diode for the duration interval of the gate pulse 31.

Since the burst tank 53 is designed to have a higher impedance than the chroma tank 51, across which the chrominance signal is developed during the scanning line interval, an amplified color synchronizing burst is principally developed across the burst tank 53, which in turn applies the separated color synchronizing burst to the burst synchronized reference signal source 71.

The burst separator 39 which functions in the manner previously described, has several advantages over many of the burst separation circuits which are designed to be separate from the chrominance signal amplifier.

First, until the color synchronizing burst is finally separated from the chrominance signal in the output circuit of the second chrominance amplifier 37, both the color synchronizing burst and the chrominance signals pass through the same chrominance amplifiers, thereby making the phase differences of the color-difference signals relative to the reference phase conveyed by the color synchronizing burst independent of circuit parameters.

Secondly, it provides amplification of the color synchronizing burst in addition to the chrominance signal.

Third, excellent burst separation performance is provided, with the circuit having the stability of separate color synchronizing burst separating circuits and chrominance amplifier circuits with the advantage of eliminating the need for separate color synchronizing burst amplifier circuits.

In order that the burst separator 39 shown in Figure 1 can be successfully incorporated in the output circuit of the second chrominance amplifier 37, one aspect of the behavior of the nature of chrominance amplifiers and synchronous demodulators must be taken into consideration.

Figures 1, 2:
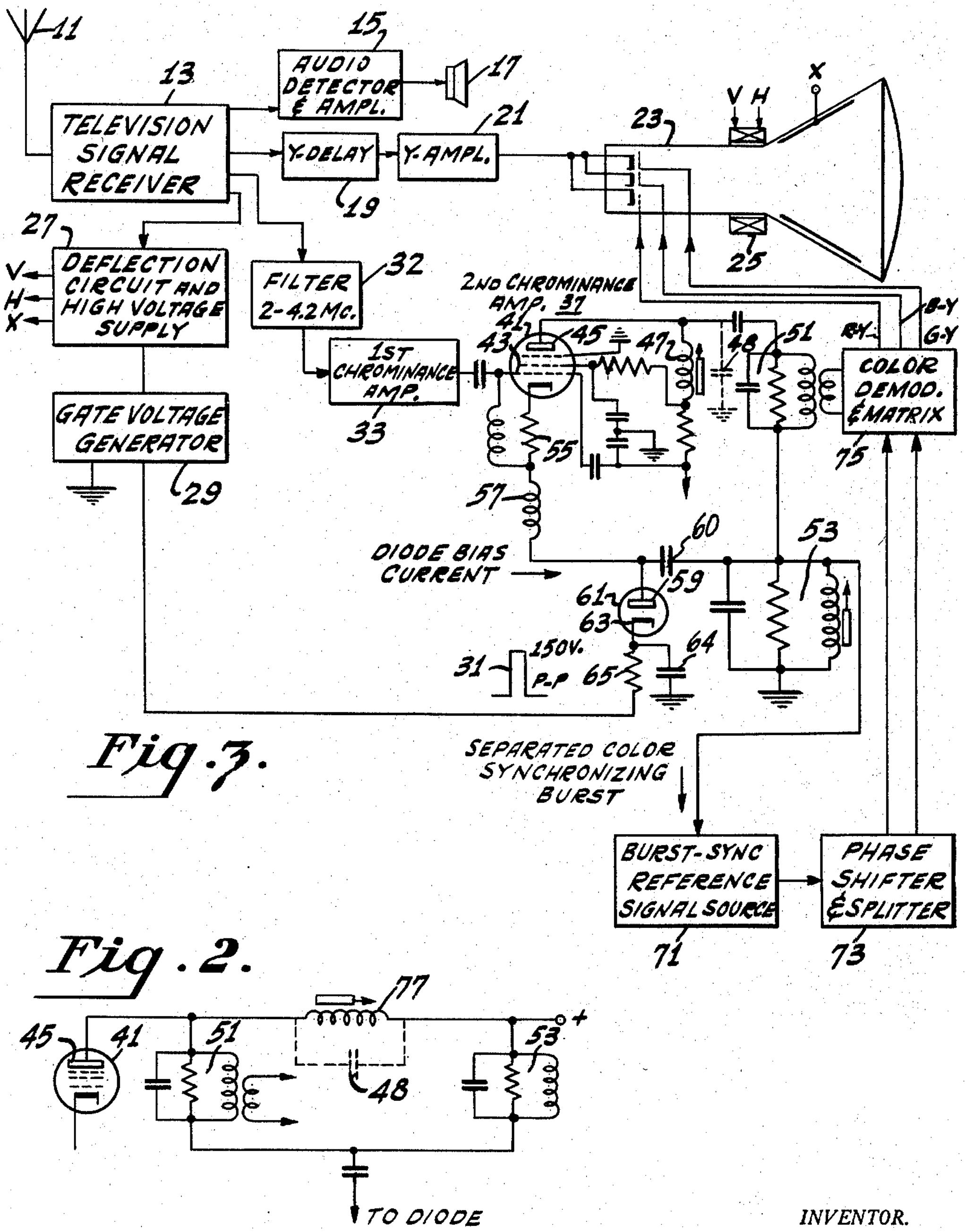
Figure 2 is a schematic diagram of the equivalent circuit of the output circuit of the chrominance amplifier shown in Figure 1; and, Figure 3 is a diagram of a color television receiver diagram utilizing one embodiment of the present invention which derives a bias current from the second chrominance amplifier.

In many color demodulator circuits, such as those that use diode or triode demodulators of the type as described by Pritchard and Rhodes in their aforementioned publication, the synchronous demodulation signal which is applied by the phase shifter and splitter 73 will flow through the source of the chrominance signal. In reference to the second chrominance amplifier 37 of Figure 1, this means that some of the synchronous demodulation signal provided by the phase shifter and splitter 73 will flow back through the chrominance tank 51 and in that way reach the burst tank 53. If there were no impedance from plate to ground in the second chrominance amplifier 37, none of the synchronous demodulating signal would appear across the burst tank 53, since only the tube current would flow through this circuit. The plate to ground capacitance 48, however, couples the chrominance tank 51 and burst tank 53 so that the synchronous demodulation signal will appear across the burst tank 53. This signal appearing in the burst separator 39 is undesirable since it produces an apparent shift in the phase of the color synchronizing burst. To minimize the coupling, the capacitance 48 is tuned out by the inductance 47 at the frequency of the color synchronizing burst to provide what is essentially a high impedance between the chrominance tank 51 and the burst tank 53, thereby making the output of the burst tank 53 relatively independent of the voltage which is developed across the chrominance tank 51. The equivalent circuit of the overall output circuit of the second chrominance amplifier 37 coupled to the anode plate 45 of the second chrominance amplifier tube 41 is shown in Figure 2. Here the inductance 77 in conjunction with the capacitance 48 provides the aforementioned high impedance circuit between the chrominance tank 51 and the burst tank 53.

During the time when each image line is being scanned, the burst tank 53 is virtually shorted out by the action of the diode 61, and the inductance 47 will be coupled across the chrominance tank 51 and become a part of that resonant circuit.

Figure 3 shows another embodiment of the present invention which is similar to the circuit shown in Figure 1 with the exception that the diode 61 derives its bias current from the second chrominance amplifier 37. As is seen in Figure 3, the cathode of the amplifier tube 41 is coupled to the anode 59 of the rectifier 61 through the resistor 55 and the inductance 57; the anode 59 of the rectifier 61 is also coupled through the blocking condenser 60 to the burst tank 53. The bias current derived from the cathode of the amplifier tube 41 of the second chrominance amplifier is adjusted in magnitude so that it is at all times greater than the peak value of alternating current chrominance signal current which flows through the diode 61. It will be noted that during the gate pulse interval there is no direct current path to ground for the cathode of the second chrominance amplifier tube 41. A direct current path is not necessary during this short interval since the current for the tube can readily flow through the capacitor 60 and the low impedance of the tuned circuit 53.

Having described the invention, what is claimed is:

1. In a color television system, means to separate color reference bursts occurring during retrace intervals from chrominance signals occurring during trace intervals, the combination of, a chrominance and burst amplifier including in series a parallel resonant chrominance tank circuit and a parallel resonant burst tank circuit, a diode coupled across siad burst tank circuit, a source of pulses corresponding in time with said bursts, means coupling said source of pulses to said diode to render it normally conductive during trace intervals and non-conductive during bursts to separate chrominance and burst signals across said respective tank circuits, and an inductance element coupled across said series combination of tank circuits, said inductance being tuned with stray capacitance to present a high impedance to the flow of burst frequency components from said chrominance tank circuit to said burst tank circuit.

2. In a color television receiver, means to separate color reference bursts occurring during retrace intervals from chrominance signals occurring during trace intervals, the combination of, a chrominance and burst amplifier including in series a parallel resonant chrominance tank circuit and a parallel resonant burst tank circuit, a diode coupled across said burst tank circuit, a source of pulses corresponding in time with said bursts, means coupling said source of pulses to said diode to render it normally conductive during trace intervals and non-conductive during bursts, color demodulators, means coupled from said burst tank circuit to said demodulators for generating color demoduating reference oscillations at the frequency and phase of said bursts, means coupling chrominance signals from said chrominance tank circuit to said demodulators, and means to prevent said reference oscillations in said demodulators from being fed back through said chrominance tank circuit to said burst tank circuit, said last named means comprising an inductance coupled across said series combination of tank circuits, said inductance being tuned with stray capacitance to present a high impedance to the flow of color demodulating reference oscillations from said chrominance tank circuit to said burst tank circuit.

References Cited in the file of this patent

UNITED STATES PATENTS

| | | |
|---|---|---|
| 2,743,311 | Richman | Apr. 24, 1956 |
| 2,754,356 | Espenlaub | July 10, 1956 |
| 2,766,321 | Parker | Oct. 9, 1956 |